United States Patent
Kilhamn et al.

(10) Patent No.: US 12,531,669 B2
(45) Date of Patent: Jan. 20, 2026

(54) DATA INDICATOR HANDLING FOR HARQ TRANSMISSIONS DURING C-DRX MODE

(71) Applicant: Telefonaktiebolaget LM Ericsson (publ), Stockholm (SE)

(72) Inventors: Natalie Kilhamn, Gothenburg (SE); Jan Lindskog, Pixbo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 368 days.

(21) Appl. No.: 18/273,337

(22) PCT Filed: Jan. 21, 2021

(86) PCT No.: PCT/EP2021/051344
§ 371 (c)(1),
(2) Date: Jul. 20, 2023

(87) PCT Pub. No.: WO2022/156896
PCT Pub. Date: Jul. 28, 2022

(65) Prior Publication Data
US 2024/0072945 A1 Feb. 29, 2024

(51) Int. Cl.
*H04L 1/00* (2006.01)
*H04L 1/1812* (2023.01)
(Continued)

(52) U.S. Cl.
CPC .......... *H04L 1/1887* (2013.01); *H04L 1/1819* (2013.01); *H04L 1/1851* (2013.01);
(Continued)

(58) Field of Classification Search
None
See application file for complete search history.

(56) References Cited

U.S. PATENT DOCUMENTS

2009/0168731 A1   7/2009   Zhang et al.
2020/0195410 A1*  6/2020   Li ..................... H04L 1/1819
(Continued)

FOREIGN PATENT DOCUMENTS

WO   2010044721 A1   4/2010
WO   2010048998 A1   5/2020
WO   WO-2020167103 A1 *  8/2020 ............ H04W 52/14

OTHER PUBLICATIONS

International Search Report and Written Opinion of the International Searching Authority, PCT/EP2021/051344, mailed Oct. 14, 2021, 9 pages.
(Continued)

*Primary Examiner* — Brandon M Renner
(74) *Attorney, Agent, or Firm* — Sage Patent Group

(57) ABSTRACT

A method for handling DL and UL HARQ transmissions for a UE. The method includes performing a first HARQ transmission including information related to a single HARQ process to the UE with an associated new data indicator, NDI. Toggling of the NDI indicates at least a change of information of the single HARQ process over a previous HARQ transmission and the first HARQ transmission moreover starting a C-DRX inactivity timer, and determining that a HARQ NACK has been received for the transmitted information from the UE. The method includes detecting a measurement gap has started and awaiting an end of the measurement gap. If the C-DRX inactivity timer has not expired at a time where the measurement gap has ended, then performing a second HARQ transmission of the information, with associated NDI to the UE for the single HARQ process. The value of the NDI is toggled in relation to a value of the NDI of the first HARQ transmission.

19 Claims, 12 Drawing Sheets

(51) Int. Cl.
*H04L 1/1829* (2023.01)
*H04L 1/1867* (2023.01)
*H04W 76/28* (2018.01)

(52) U.S. Cl.
CPC .......... *H04L 1/1864* (2013.01); *H04L 1/1883* (2013.01); *H04L 1/1896* (2013.01); *H04W 76/28* (2018.02)

(56) References Cited

U.S. PATENT DOCUMENTS

| | | | | |
|---|---|---|---|---|
| 2021/0153047 A1* | 5/2021 | Jiang | ...................... | H04W 76/27 |
| 2021/0167930 A1* | 6/2021 | Jeon | ...................... | H04L 5/0098 |
| 2022/0116850 A1* | 4/2022 | Ahn | ...................... | H04W 72/12 |

OTHER PUBLICATIONS

3GPP TS 38.321 v15.11.0 (Dec. 2020); 3rd Generation Partnership Project; Technical Specification Group Radio Access Network; NR; Medium Access Control (MAC) protocol specification (Release 15), 79 pages.

3GPP TS 38.321 v16.2.1 (Sep. 2020); 3rd Generation Partnership Project; Technical Specification Group Radio Access Network; NR; Medium Access Control (MAC) protocol specification (Release 16), 154 pages.

\* cited by examiner

DATA INDICATOR HANDLING FOR HARQ TRANSMISSIONS DURING C-DRX MODE

CROSS REFERENCE TO RELATED APPLICATIONS

This application is a 35 U.S.C. § 371 national stage application of PCT International Application No. PCT/EP2021/051344 filed on Jan. 21, 2021, the disclosure and content of which is incorporated by reference herein in its entirety.

TECHNICAL FIELD

The present disclosure relates generally to the field of wireless communication. More particularly, to a method, a base station and a user equipment, UE, for handling downlink, DL, and uplink, UL, hybrid automatic repeat request, HARQ, transmissions during connected discontinuous reception, C-DRX, mode.

BACKGROUND

In a typical wireless communication network, a user equipment, UE, communicates with a base station serving the UE. Communication from the base station to the UE is referred to as downlink, DL communication, whereas communication from the UE to the base station is referred to as uplink, UL communication. Thus, the UE involves in bidirectional radio communication with the base station.

In some networks, communications between the base stations and the UE is subject to interference, resulting in loss of data during communication. A technique referred to as Hybrid Automatic Repeat Request, HARQ, is therefore sometimes employed. A HARQ protocol is used between the base station and UE as specified in the third-generation partnership project, 3GPP, technical specification, TS 38.321. The purpose of the HARQ protocol is to recover from data decoding failures in both directions by sending feedback which includes either an acknowledgement, ACK, or negative acknowledgement, NACK, from a receiver, i.e., UE to a transmitting side, i.e., base station, allowing for retransmission.

There are several types of HARQ systems. In some HARQ systems, retransmission includes error correction and detection information, but no data retransmission. In other types of HARQ systems, a retransmission includes retransmission of data.

Further, a Radio Link Control, RLC, protocol is used for error correction of delivered data (i.e., PDU). In new radio, NR, systems, RLC is located on top of the Medium Access Control, MAC, layer, which the HARQ procedures are a part of. As such, an RLC retransmission is a tool used when the HARQ protocol fails to deliver the PDU. For each RLC PDU sent from base station to UE, an RLC ACK/NACK is expected to be returned. If such a PDU is lost, the UE can detect this using the sequence numbering, and send an RLC NACK after a certain amount of time.

FIG. 1 illustrates a schematic diagram of channels for a DL transmission when used with analogue beamforming, where slot n, slot n+1 to slot n+4 are shown. The slot n represents a DL slot where the UE when decoding the PDCCH 100 receives DL data in PDSCH 101 and the UE reports feedback of the decoded result (ACK or NACK) in PUCCH 102. Reference numeral 103 indicates that the PDCCH contains a field representing where a PDSCH 101 data is received and in 104 the PDCCH contains a second field controlling when PUCCH 102 is transmitted to the base station.

The numerals 0, 1, 2 and 3 in the slots n through n+3 represent DL slots and n+4 represents UL slots. The configuration and positioning of DL and UL slots is decided by the base station and need not be determined in advance. However, the position of the possible PDCCH occasions (at the start of slots n through n+3) are configured by the base station in advance. The UE need to continuously attempt to decode every possible PDCCH.

For any transport block sent over PDSCH, there exists one bit representing the feedback—ACK or NACK which is included in the PUCCH (as indicated by the PDCCH). When the base station attempts to decode the PUCCH, there are three possibilities which can include the following options a) PUCCH is correctly decoded and the feedback bit indicates ACK b) PUCCH is correctly decoded and the feedback bit indicates NACK, or c) the base station fails to decode the PUCCH.

Option 'c' can occur due to interference or a weak UE signal at the time of the PUCCH, or alternatively because the UE did not send the PUCCH at all. Such a "missing PUCCH" may in turn occur because the UE failed to decode the original PDCCH, in which case the UE has not received the corresponding PDSCH.

As stated above, the purpose of the HARQ protocol is to recover from data decoding failures in both directions by sending feedback (ACK/NACK) from receiver to transmitting side allowing for retransmission. In the HARQ protocol, a new data indicator, NDI, is provided. The NDI is toggled, from a previous value when new data is handled by the HARQ process. The toggling of the NDI refers to a scenario when previous received NDI for single HARQ process is either '0' and new NDI is decoded as '1' or vice versa.

When there is a HARQ retransmission, NDI is retained to its previous value. The NDI indicates the UE that the UE is prepared to receive a PDSCH transmission with new data for the single HARQ process ID, when the NDI is toggled. If the NDI is not toggled, then the UE is prepared to receive a PDSCH retransmission for the single HARQ process ID, which means that the base station sends the same data as in the preceding transmission(s) belonging to the HARQ process, to help the UE decode the data even if the UE has not succeeded in decoding those previous transmissions.

During certain time periods, the UE operates in a Continuous Mode Discontinuous Reception, C-DRX, which is a mode of UE configuration where the UE refrains from decoding the PDCCH as described above in FIG. 1. The purpose of the C-DRX mode is to allow the UE to reduce power consumption by creating a pattern of "sleep" periods when there is no application data to receive or transmit to and from the base station. The C-DRX configuration includes a C-DRX Inactivity timer, which is a timer running from 0 to a fixed time period. When the UE receives a PDCCH indicating a planned PDSCH or PUSCH containing new data, indicated by a toggled NDI, the C-DRX Inactivity timer is reset to 0. If the C-DRX Inactivity timer ever runs out, i.e., if the maximum configured time interval is reached without the base station initiating any new data, then the UE enters an inactive state (i.e., the "sleep" period).

Further, in NR systems, each UE is connected to an evolved Node Base station, eNB, (in LTE) and a gNB simultaneously. Consequently, the UE can be configured to perform measurements necessary for the eNB connection in a regular pattern. Furthermore, during such a measurement occasion, the UE shall not be able to send or receive anything to/from the gNB. To the gNB, this appears as a measurement gap during which the UE is completely unreachable.

During the instances, where the UE is operating in C-DRX mode and the UE being configured with the measurement gap, the base station and the UE performs various steps for HARQ retransmission as described in FIG. 2. The UE is configured with a C-DRX inactivity timer with a time interval set to 8 ms and the measurement gap for the UE is set to 6 ms.

Initially, at time t=0 a new data transmission (indicated as #1) is initiated by the base station i.e., gNB, and PDCCH is signaled to the UE. This transmission consists of a MAC PDU which contains one or more RLC PDUs. The NDI for transmission #1 was set to "0". When the UE receives the PDCCH, the C-DRX Inactivity timer is reset 203 and the C-DRX Inactivity timer runs out at t=8 ms, unless reset 206 again. When the gNB decodes 201 the corresponding PUCCH, the feedback for transmission #1 is NACK.

At time interval i.e., t=1, the measurement gap starts 204. The gNB cannot send 205 anything to the UE until t=7. At t=7, the gNB has the option to send 202 a transmission #2 to the UE. Since transmission #1 was marked as NACK, the typical procedure is to perform a HARQ retransmission, which means sending the same data and using NDI=0, i.e., the NDI not toggled.

However, sending the same data by a HARQ retransmission without toggling the NDI shall not reset the C-DRX Inactivity timer. In the time between t=7 and t=8, the gNB has a limited number of chances to transmit to the UE. If there are other connected UEs, and fairness between UEs is deemed desirable, it is likely that the UE only has one single attempt. To prevent the C-DRX Inactivity timer from elapsing, the gNB needs to send a transmission with a toggled NDI, indicating new data—which starts a second HARQ process in parallel to the first HARQ process, or causing the UE to discard the contents, losing transmission #1.

Thus, when the UE is operating in C-DRX mode with configured C-DRX inactivity timer and with configured measurement gap, the gNB has to decide for a trade-off i.e., to a) complete ongoing transmissions early and 2) stop the UE from entering C-DRX inactive mode.

Consequently, there is a need of a new mechanism for handling downlink, DL and UL, HARQ retransmissions when the UE is operating in the C-DRX mode with a configured measurement gap.

SUMMARY

It is therefore an object of the present disclosure to provide a method, a base station, and a user equipment, UE, for handling HARQ transmissions that seek to mitigate, alleviate, or eliminate all or at least some of the above-discussed drawbacks of presently known solutions.

This and other objects are achieved by means of a method, a base station, and the UE as defined in the appended claims. The term exemplary is in the present context to be understood as serving as an instance, example or illustration.

According to a first aspect of the present disclosure, a method for handling downlink, DL, hybrid automatic repeat request, HARQ, transmissions for a user equipment, UE, operating in a connected discontinuous reception, C-DRX, mode is provided. The method is performed by a base station. The method comprises performing a first HARQ transmission comprising information related to a single HARQ process to the UE with an associated new data indicator, NDI. Toggling of the NDI indicates at least a change of information of the single HARQ process over a previous HARQ transmission and the first HARQ transmission moreover starting a C-DRX inactivity timer. The method comprises determining that a HARQ negative acknowledgement, NACK, has been received for the transmitted information from the UE. The method comprises detecting whether a measurement gap has started and if the measurement gap has started, awaiting an end of the measurement gap. The method comprises determining whether the C-DRX timer has expired at a time where the measurement gap has ended. If the C-DRX inactivity timer has not expired, then the method comprises performing a second HARQ transmission, which is a retransmission, of the information, with associated NDI to the UE for the single HARQ process. The value of the NDI is toggled in relation to a value of the NDI of the first HARQ transmission.

In some embodiments, the C-DRX inactivity timer is restarted by reception of the HARQ retransmission.

In some embodiments, the measurement gap overlaps at least partly with a time interval between a start and expiry of the C-DRX inactivity timer.

In some embodiments, the C-DRX inactivity timer being configured to expire in a pre-determined time interval after ending of the measurement gap.

In some embodiments, a difference between the time interval between the start and the expiry of the C-DRX inactivity timer and a time interval of the measurement gap is minimum.

In some embodiments, the time interval between the start and the expiry of the C-DRX inactivity timer being less than ten milli-seconds, ms.

In some embodiments, the base station is a new radio, NR base station, which is a gNodeB, wherein the measurement gap being six ms and the time interval between the start and the expiry of the C-DRX inactivity timer being eight ms.

According to a second aspect of the present disclosure, a method for handling uplink, UL, hybrid automatic repeat request, HARQ, transmissions from a user equipment, UE, operating in a connected discontinuous reception, C-DRX, mode. The method is performed by a base station. The method comprises transmitting a request for a first HARQ transmission related to a single HARQ process with an associated new data indicator, NDI, to the UE. Toggling of the NDI indicating at least a change of information of the single HARQ process over a previous transmission. The first HARQ transmission from the UE moreover starting a C-DRX inactivity timer. The method comprises receiving the first HARQ transmission from the UE and determining that a HARQ NACK has been received. The method comprises determining whether a measurement gap has started. If the measurement gap has started, awaiting an end of the measurement gap. Further, the method comprises determining whether the C-DRX inactivity timer has expired at a time where the measurement gap has ended. If the C-DRX inactivity timer has not expired, the method comprises transmitting a request for a second HARQ transmission of the information, with associated NDI to the UE for the single HARQ process. The value of the NDI is toggled in relation to a value of the NDI of the first HARQ transmission. Further, the method comprises receiving the second HARQ transmission from the UE.

According to a third aspect of the present disclosure, there is provided a method for handling uplink, UL HARQ transmissions to a base station. The method is performed by a UE operating in a C-DRX mode. The method comprises receiving a request for a first HARQ transmission related to a single HARQ process with an associated new data indicator, NDI, from the base station, wherein a toggling of the NDI indicating at least a change of information of the single HARQ process over a previous transmission. The request for first HARQ transmission moreover starting a C-DRX inactivity timer. The method comprises performing the first HARQ transmission to the base station and detecting whether a measurement gap has started and if the measurement gap has started, awaiting an end of the measurement gap. The method comprises determining that C-DRX Inactivity timer has not expired at a time where the measurement gap has ended. If the C-DRX inactivity timer has not expired, the method comprises receiving a request for a second HARQ transmission of the information, with associated NDI from the base station for the single HARQ process. Further, the method comprises determining whether a value of the NDI is toggled in relation to a value of the first HARQ transmission. If the value of the NDI is toggled, then the method comprises performing a retransmission of the information during second HARQ transmission to the base station.

According to a fourth aspect of the present disclosure, there is provided a base station for handling downlink, DL hybrid automatic repeat request, HARQ, transmissions for a user equipment, UE, operating in a connected discontinuous reception, C-DRX, mode. The base station comprises a plurality of hybrid automatic repeat request HARQ entities cooperating with a scheduler for transmitting frames from at least the base station to the user entity. The base station is adapted for performing a first HARQ transmission comprising information related to a single HARQ process to the UE with an associated new data indicator, NDI. A toggling of the NDI indicating at least a change of information of the single HARQ process over a previous HARQ transmission. The first HARQ transmission moreover starting a C-DRX inactivity timer. The base station is adapted for determining that a HARQ NACK has been received for the transmitted information from the UE. The base station is adapted for determining whether a measurement gap has started and if the measurement gap has started, awaiting an end of the measurement gap. Further, the base station is adapted for determining whether the C-DRX inactivity timer has expired at a time where the measurement gas has ended. If the C-DRX inactivity timer has not expired, then the base station is adapted for performing a second HARQ transmission, which is a retransmission, of said information, with associated NDI to the UE for the single HARQ process. A value of the NDI is toggled in relation to a value of the NDI of the first HARQ transmission.

According to a fifth aspect of the present disclosure, there is provided a base station for handling uplink, UL hybrid automatic repeat request, HARQ, transmissions for a user equipment, UE, operating in a connected discontinuous reception, C-DRX, mode. The base station having a plurality of HARQ entities cooperating with a scheduler for transmitting frames from at least the base station to the UE. The base station adapted for transmitting a request for a first HARQ transmission related to a single HARQ process with an associated new data indicator, NDI to the UE. Toggling of the NDI indicating at least a change of information of the single HARQ process over a previous HARQ transmission. The request for first HARQ transmission moreover starting a C-DRX inactivity timer. The base station is adapted for receiving the first HARQ transmission from the UE and determining that a HARQ NACK has been received. The base station is adapted for detecting whether a measurement gap has started. If the measurement gap has started, awaiting an end of the measurement gap. The base station is adapted for determining whether the C-DRX timer has expired at a time where the measurement gap has ended. If the C-DRX inactivity timer has not expired, then the base station is adapted for transmitting a request for second HARQ transmission, with associated NDI to the UE for the single HARQ process. A value of the NDI is toggled in relation to a value of the NDI of the first HARQ transmission. Further, the base station is adapted for receiving the second HARQ transmission from the UE.

According to a sixth aspect of the present disclosure, there is provided a user equipment, UE, for handling uplink, UL, hybrid automatic repeat request, HARQ, transmissions. The UE is operating in a C-DRX mode and the UE is engaged in at least one HARQ process for transmitting data to the base station. The UE being adapted for receiving a request for a first HARQ transmission related to a single HARQ process with an associated new data indicator, NDI from the base station. Toggling of the NDI indicates at least a change of information of the single HARQ process over a previous HARQ transmission. The first HARQ transmission moreover starting a C-DRX inactivity timer. The UE is adapted for performing the first HARQ transmission to the base station and detecting whether a measurement gap has started. If the measurement gap has started, awaiting an end of the measurement gap. The UE is adapted for determining whether the C-DRX inactivity timer has expired at a time where the measurement gap has ended. If the C-DRX inactivity timer has not expired, then the UE is adapted for receiving a request for a second HARQ transmission of the information, with associated NDI from the base station for the single HARQ process. The UE is adapted for determining whether a value of the NDI is toggled in relation to a value of the NDI of the first HARQ transmission. If the value of the NDI is toggled, the UE is adapted for performing a retransmission, of the information during second HARQ transmission to the base station.

An advantage of some embodiments is that alternative and/or improved approaches for handling downlink and uplink HARQ transmissions during C-DRX mode are provided.

An advantage of some embodiments is that the proposed method allows toggling the value of the NDI to restart the C-DRX inactivity timer, since the usage the same value of the NDI shall not restart the C-DRX-inactivity timer, and there may be a chance of the timer elapsing before any other UL transmission takes place.

In some embodiments, the proposed method allows toggling the value of the NDI on DL and UL HARQ retransmissions when a measurement gap has occurred between the previous transmission attempt and a new transmission attempt from the base station and the UE.

An advantage of some embodiments is that latency is reduced by toggling the value of the NDI to restart the C-DRX inactivity timer. It should be noted that, for real time critical applications, latency is vital. Thus, by toggling the value of NDI, the chances of entering the C-DRX inactive state, causing a long latency can be avoided. In some cases, retransmitting a MAC PDU which has already been received, costs far less in terms of latency for applications involving huge data traffic.

An advantage of some embodiments is that the proposed method allows for configuration of a C-DRX inactivity timer to a lower value, i.e., for example, the C-DRX inactivity timer may be configured with a time interval of 10 milliseconds, ms, since the chance of the UE entering into the undesirable state is mitigated. A shorter C-DRX inactivity timer generally leads to reduced power consumption by the UE.

An advantage of some embodiments is that when the UE has an ongoing DL HARQ process but, due to a measurement gap, the C-DRX inactivity timer is about to expire. In such scenario, the base station i.e., gNB initiates a transmission on the same HARQ process ID, indicating to the UE that this transmission contains new data, while re-sending the same MAC PDU. This avoids losing the MAC PDU, while still preventing the UE from entering into the C-DRX inactive state.

An advantage of some embodiments is that when the UE has an ongoing UL HARQ process but, due to a measurement gap, the C-DRX inactivity timer is about to expire. In such scenario, the base station i.e., gNB initiates a transmission on the same HARQ process ID, indicating to the UE that this transmission contains new data, in order to prevent the UE from entering into the C-DRX inactive state.

An advantage of some embodiments is that when the UE is requested to start a new transmission on a previously used HARQ process ID shortly after a measurement gap as mentioned above, the UE shall re-send the same MAC PDU. This avoids losing the MAC PDU.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
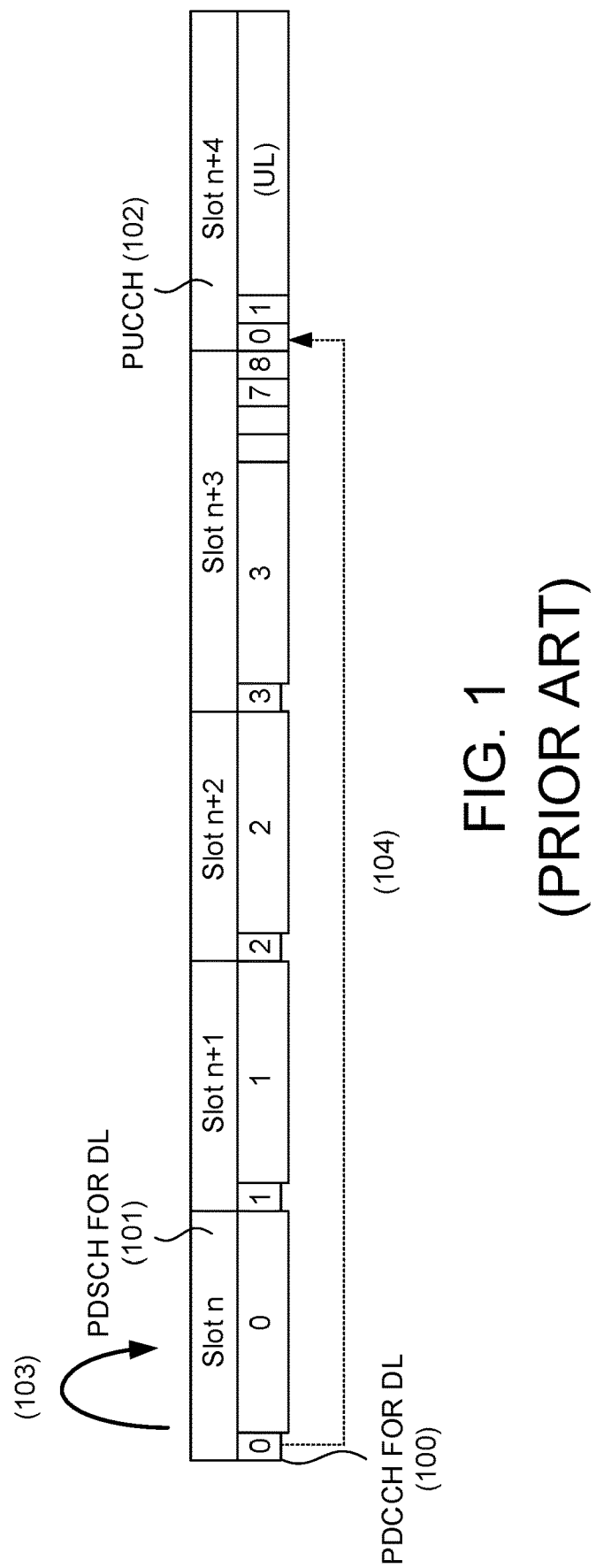
FIG. 1 illustrates a schematic diagram of channels for a Downlink, DL, transmission according to prior art.
Figure 2:
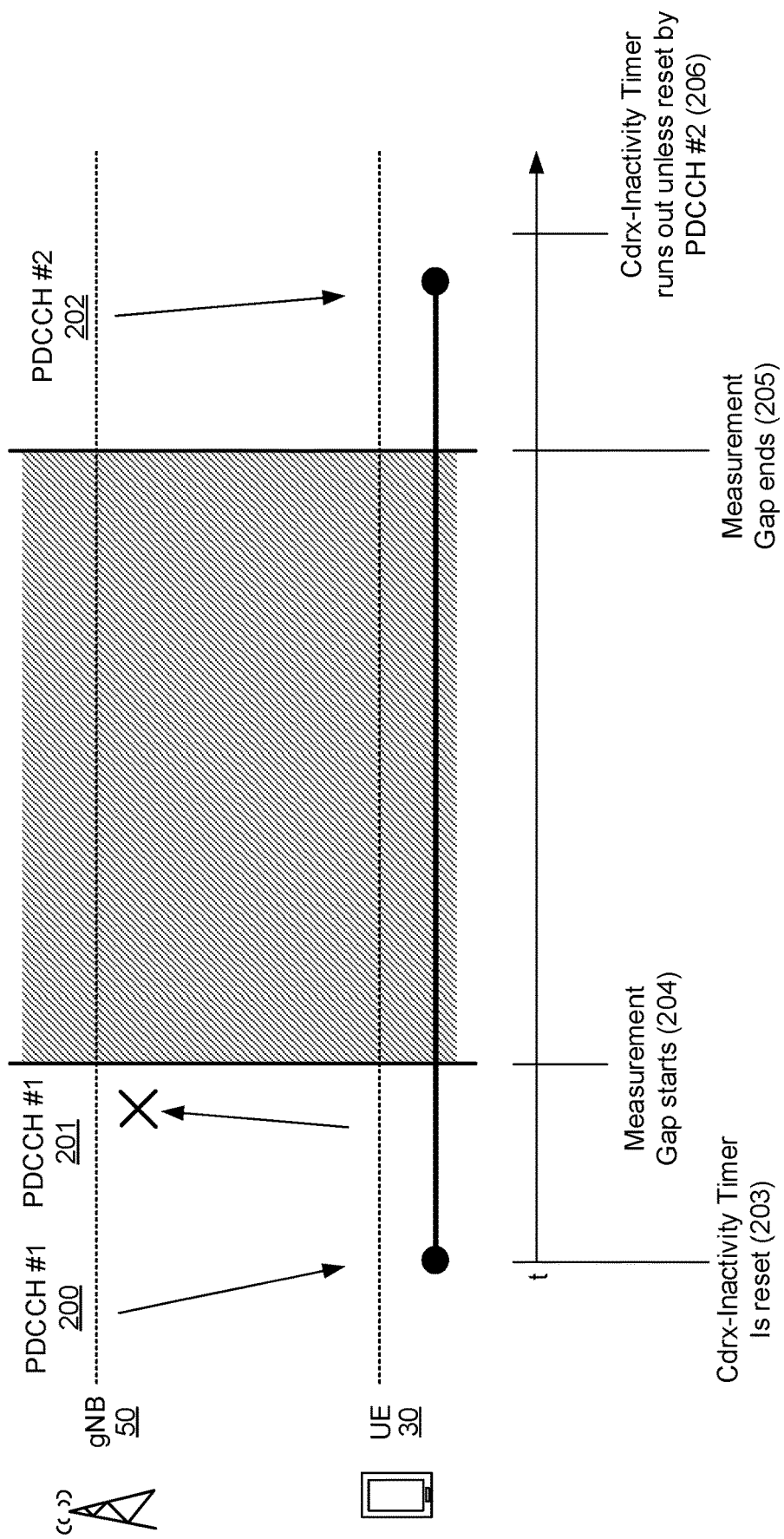
FIG. 2 is an example schematic diagram showing various steps between a base station and a user equipment, UE for HARQ transmission according to prior art.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Throughout the description, the terms base station and gNB are used interchangeably.

The following aspects have been presented herein for better understanding of various embodiments of the present disclosure.

The UE is connected to both eNB and gNB. The UE is configured with C-DRX on gNB. The UE is a New Radio, NR, capable UE, i.e., NR-UE. Further, the UE is configured to have LTE measurement gaps in its connection to gNB, and gNB is aware of the configured measurement gap such that gNB can take into account exactly when a measurement gap starts and ends.

The new data indicator, NDI flag according to 3GPP TS 25.321 is used by a base station i.e., either Node B or eNodeB as an indication for the UE. According to the existing 3GPP specification, the conditions for operating the NDI are specified herein:

The HARQ process sets NDI in transmitted MAC-hs PDUs. The base station i.e., NodeB should: set the NDI to the value "0" for the first MAC-hs PDU transmitted by a HARQ process; —not increment the NDI for retransmissions of a MAC-hs PDU; increment the NDI with one for each transmitted MAC-hs PDU containing new data.

According to 3GPP TS 25.321, it is noted that the scheduler in the NodeB, may re-use transmit sequence numbers, TSNs by toggling the NDI bit in order to resume pre-empted transmissions or to force the UE to flush the soft buffer. In this case, the content of the payload may be changed but the higher layer data order is preserved.

Figure 3:
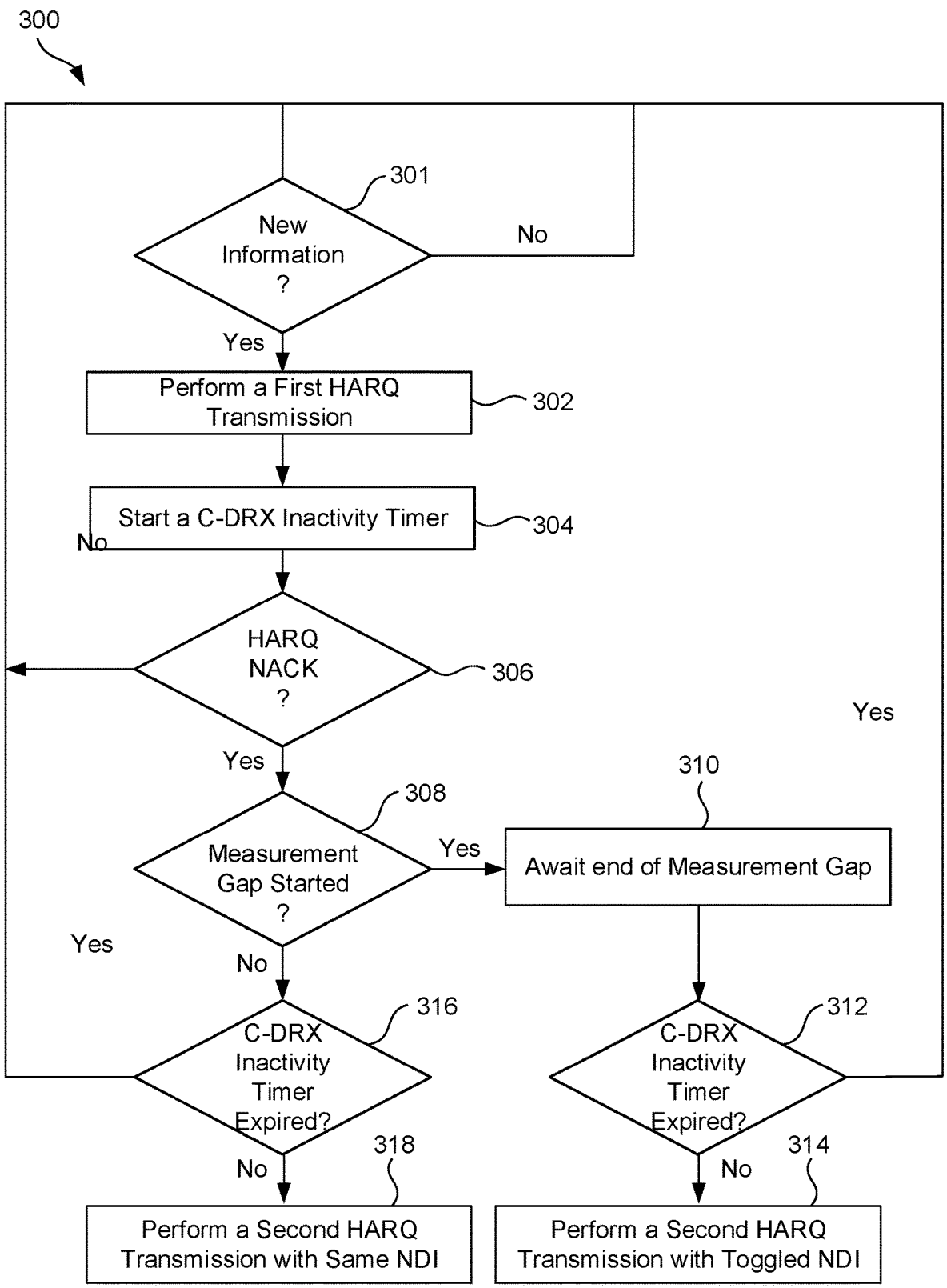
FIG. 3 is a flowchart illustrating example method steps for handling downlink, DL HARQ transmission according to some embodiments.

FIG. 3 is a flowchart illustrating example method steps for handling downlink, DL HARQ transmission according to some embodiments. A base station, i.e., a gNB implements various steps in method 300 for handling DL HARQ transmission as described herein. At step 301, the method 300 comprises determining whether new information is available for DL transmission to a UE. If the base station determines that there is no new information available for DL transmission to the UE, then the base station continues to determine availability of new information for DL transmission to the UE.

If the base station determines that there exists new information for DL transmission to the UE 30, then at step 302, the method 300 comprises performing a first HARQ transmission related to a single HARQ process to the UE. For example, the first HARQ transmission comprises information related to the single HARQ process with an associated new data indicator, NDI. The NDI is a binary value which can be either "0" or "1". The NDI may be initialized to a value i.e., either "0" or "1" for performing the first HARQ transmission to the UE. The base station toggles the value of the NDI i.e., from either "0" to 1" or from "1" to "0" to indicate a change of information of the single HARQ process over a previous HARQ transmission. In an example, if the base station initializes NDI to "0" for a first HARQ transmission, the base station toggles the NDI to "1" for a second HARQ transmission to indicate to the UE that the second HARQ transmission includes new information. Thus, the toggling of the NDI indicates a change of information of the single HARQ process over the previous HARQ transmission.

At step 304, the method 300 comprises starting a C-DRX inactivity timer. In an example, the first HARQ transmission to the UE triggers an initiation or start of C-DRX inactivity timer at the UE and the base station. The C-DRX inactivity timer starts from a time interval "0" to a pre-configured timer interval i.e., 8 milli-seconds, ms. Thus, the time interval between the start and the expiry of the C-DRX inactivity timer is eight ms. In some examples, the time interval between start and the expiry of the C-DRX inactivity timer may be less than ten ms. In some examples, a difference between the time interval between the start and the expiry of the C-DRX inactivity timer and a time interval of the measurement gap is minimum.

When the C-DRX inactivity timer is running, at step 306, the method 300 comprises determining whether a HARQ NACK is received in PUCCH. The base station 50 determines whether a HARQ NACK is received in PUCCH for the first HARQ transmission from the UE. If the base station determines that there is no HARQ NACK received in PUCCH for the first HARQ transmission, then the base station determines that the first HARQ transmission to the UE is successful and the method 300 loops back to the step 301 for determining if there is any new information for DL transmission to the UE.

At step 306, if the base station determines that the HARQ NACK is received, then at step 308, the method 300 comprises detecting whether the measurement gap has started. In an example, the measurement gap is pre-configured to the UE by the base station and the configured measurement gap may be 6 ms. During the measurement gap period i.e., 6 ms, the UE is not reachable for the base station to perform for any data transmission and the UE performs measurement of neighbouring cells during the measurement gap period.

When it is determined that the measurement gap has started, at step 310, the method 300 comprises awaiting an end of the measurement gap. The measurement gap ends after the time interval of 6 ms. After the end of the measurement gap, at step 312, the method 300 comprises determining whether the C-DRX inactivity timer has expired at a time where the measurement gap has ended. In an example, the C-DRX inactivity timer expires only after the end of the measurement gap, as the configured time interval i.e., 8 ms, of the C-DRX inactivity timer is greater than the configured measurement gap i.e., 6 ms. In some examples, the C-DRX inactivity timer is configured to expire in a pre-determined time interval after ending of the measurement gap. Thus, when the measurement gap is configured to be 6 ms, the C-DRX timer expires after the pre-determined time interval, which is 2 ms, in the above example. Therefore, it should be noted that the C-DRX inactivity timer is configured to expire in a shorter duration after ending of the measurement gap.

At step 312, if it is determined that the C-DRX inactivity timer has not expired, then at step 314, the method 300 comprises performing a second HARQ transmission which is a retransmission of the information, with associated NDI to the UE for the single HARQ process. The second HARQ transmission is a retransmission of the information transmitted in the first HARQtransmission. In the second HARQtransmission, value of the NDI is toggled in relation to a value of the NDI of the first HARQ transmission. Thus, the base station toggles the NDI for the second HARQ transmission though the second HARQ transmission is a retransmission of the information transmitted in the first HARQ transmission. The toggling of the NDI for the second HARQ transmission when the C-DRX inactivity timer has not expired, i.e., before the expiry of the C-DRX inactivity timer, resets or restarts the C-DRX inactivity timer, which may otherwise cause the C-DRX inactivity timer to expire, thereby allowing the UE to enter into sleep mode. Therefore, the base station performs second HARQ transmission by toggling the NDI to indicate the retransmission of the information as a new information to the UE, to reset or restart the C-DRX inactivity timer.

If at step 312, it is determined that the C-DRX inactivity timer is expired after the ending of the measurement gap, then the method 300 loops back to the step 301 to determine the availability of new information for DL transmission to the UE.

Further, at step 308, if it is detected that the measurement gap has not started, then at step 316, the method 300 comprises determining whether the C-DRX inactivity timer has expired. If the C-DRX timer has not expired, then at step 318, the method comprises performing a second HARQ transmission with same NDI. The second HARQ transmission is a retransmission of the information transmitted in the first HARQ transmission. The value of the NDI is not toggled for the second HARQ transmission. Thus, the base station 50 performs the second HARQ transmission with the same NDI for the second HARQ transmission. At step 316, if it is determined that the C-DRX inactivity timer has expired then the method 300 loops back to the step 301 to determine the availability of new information for DL transmission to the UE.

It should be noted that a person skilled in the art may understand that the base station performs the second HARQ transmission, which is a retransmission of same information, thereby increasing the risk that the base station i.e., gNB transmits a MAC SDU which has already been successfully received by the UE and has been delivered to higher layers.

Specifically, there is a possibility that transmission #1 (302) was successful and decoded correctly by the UE, and that the PUCCH feedback (306) was corrupt due to interference or noise. In such a scenario, transmission #2 (314) includes a second copy of the same MAC PDU. In such a case, for example, the RLC PDU contained inside the MAC PDU shall, according to the RLC protocol, be identified as duplicate and can be discarded.

It should be further noted that if incremental redundancy is being used, at step 314, the incremental redundancy shall be reinitialized similar to that of new HARQ data transmissions.

Figure 4:
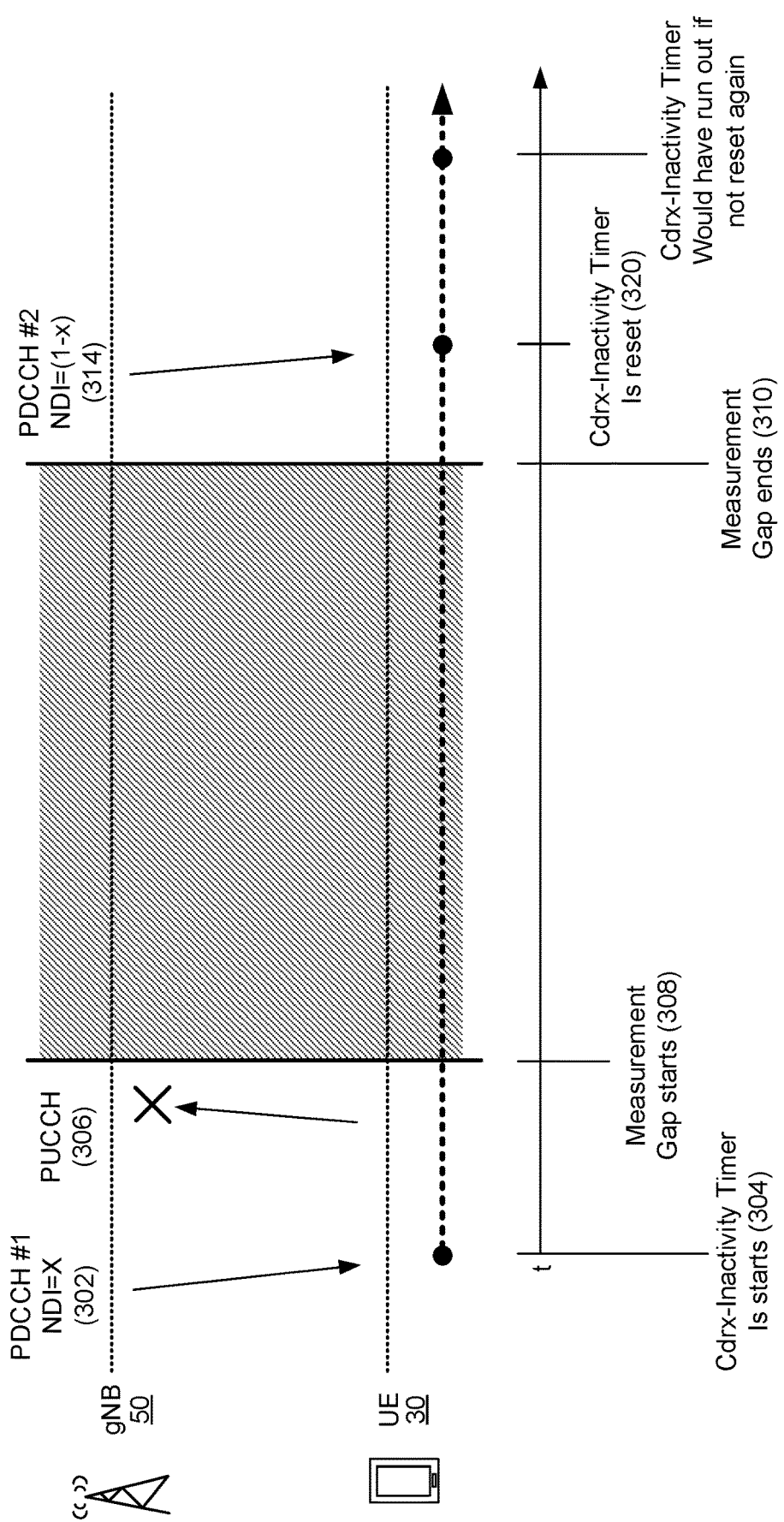
FIG. 4 is an example schematic diagram showing various steps between base station and user equipment for DL HARQ transmission according to some embodiments.

FIG. 4 is an example schematic diagram showing various steps between a base station 50 and a UE for DL HARQ transmission according to the flow chart described in FIG. 3. When the UE 30 is operating in C-DRX mode and is configured with a measurement gap which overlaps with the time interval of the C-DRX inactivity timer, the base station 50 and the UE 30 performs various steps for DL HARQ retransmission as described herein. The UE 30 is configured with a C-DRX inactivity timer with a time interval of 8 ms and the measurement gap for the UE is 6 ms.

Initially, at time t=0, a new data transmission (indicated as #1) is initiated by the base station i.e., gNB 50, and the PDCCH is signalled 302 to the UE 30. This transmission consists of a MAC PDU which contains one or more RLC PDUs. The NDI for transmission #1 was set to "0". When the UE receives the PDCCH, the C-DRX Inactivity timer starts 304 and the C-DRX Inactivity timer runs out at t=8 ms unless reset again. When the gNB 50 decodes the corresponding PUCCH 201, the feedback for transmission #1 is NACK 306.

At time instance i.e., t=1, the measurement gap starts 308. The gNB 50 cannot send 310 anything to the UE until t=7. At t=7, the gNB 50 performs data transmission indicated as transmission #2 to the UE 30. Since transmission #1 was marked as NACK, the gNB 50 performs a HARQ transmission 314, indicated as transmission #2 to the UE 30. Thus, the gNB 50 performs a HARQ transmission, which is a retransmission of the same information transmitted in the transmission #1 with the toggled NDI, i.e., the value of the NDI is toggled to "1".

The gNB 50 transmits the same data by a HARQ retransmission with toggled NDI to indicate the UE that the HARQ retransmission is new information so as to restart the C-DRX inactivity timer. In response to reception of the HARQ retransmission from the gNB 50, the C-DRX Inactivity timer is reset 320.

Figure 5:
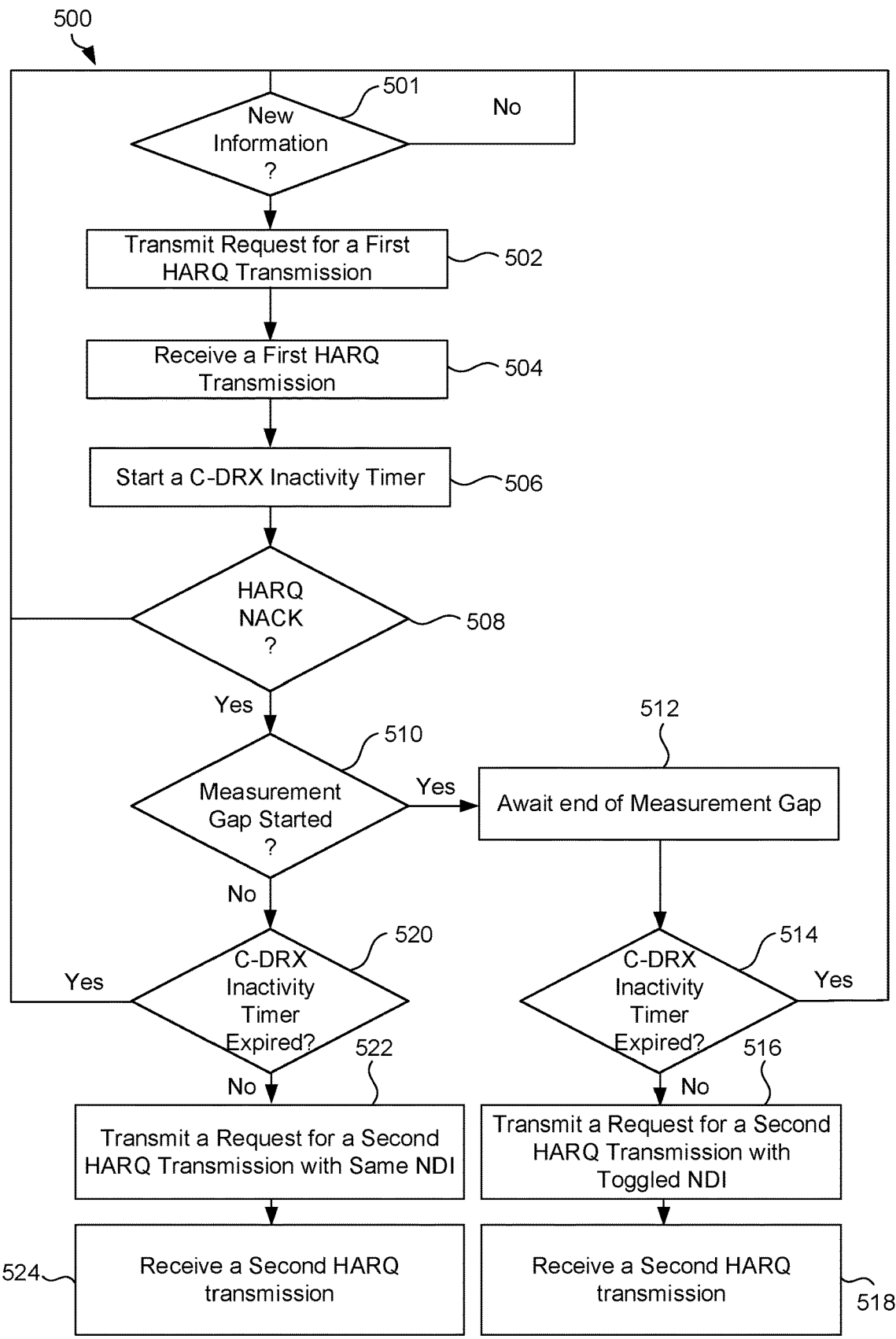
FIG. 5 is a flowchart illustrating example method steps for handling uplink, UL HARQ transmission according to some embodiments.

FIG. 5 is a flowchart illustrating example method steps for handling uplink, UL, HARQ transmission according to some embodiments. A base station, i.e., gNB performs various steps in method 500 for handling UL HARQ transmission as described herein. At step 501, the method comprises determining whether new information is available at the UE for UL transmission to the base station. If the base station determines that there is no new information available for UL transmission, then the base station continues to determining if there is any new information for UL transmission from the UE.

If the base station 50 determines that there exists new information for UL transmission from the UE, then at step 502, the method comprises transmitting a request for a first HARQ transmission related to a single HARQ process with an associated NDI to the UE. The base station toggles the value of the NDI to indicate a change of information of the single HARQ process over a previous HARQ transmission.

At step 504, the method 500 comprises receiving a first HARQ transmission from the UE. Upon reception of the first HARQ transmission, at step 506, the method 500 comprises starting a C-DRX inactivity timer. In an example, the first HARQ transmission to the UE triggers an initiation or start of C-DRX inactivity timer at the UE and the base station. The C-DRX inactivity timer starts from a time interval "0" ms to a pre-configured timer interval i.e., 8 ms.

At step 508, the method 500 comprises determining whether a HARQ NACK is received in PUCCH. If the base station 50 determines that there is no HARQ NACK received in PUCCH for the first HARQ transmission, then the base station determines that the first HARQ transmission to the UE is successful and the method 500 loops back to the step 501 for determining if there is any new information for UL transmission from the UE.

If the base station determines that the HARQ NACK is received, then at step 510, the method 500 comprises detecting whether the measurement gap has started. When it is detected that the measurement gap has started, then at step 512, the method 500 comprises awaiting end of the measurement gap. The measurement gap ends after the time interval of 6 ms. After the end of the measurement gap, at step 514, the method 500 comprises determining whether the C-DRX inactivity timer has expired at a time where the measurement gap has ended.

If at step 514, it is determined that the C-DRX inactivity timer has not expired, then at step 516, the method 500 comprises transmitting a request for second HARQ transmission with toggled NDI. The request for second HARQ transmission is a request for retransmission of the information transmitted in the first HARQ transmission.

When the UE receives the request for second HARQ transmission with toggled NDI, the UE transmits the second HARQ transmission which is a retransmission of information of the first HARQ transmission as in step 504. At step 518, the method 500 comprises receiving the second HARQ transmission. Thus, it should be noted that the base station receives a retransmission of the same information during the second HARQ transmission even though the NDI is toggled, to allow the UE to perform a new transmission.

If at step 514, it is determined that the C-DRX inactivity timer is expired after the ending of the measurement gap, then the method 500 loops back to the step 501 to determine the availability of new information for UL transmission from the UE.

Further, at step 510, if it is determined that the measurement gap has not started, then at step 520, the method 500 comprises determining whether the C-DRX inactivity timer has expired. If the C-DRX timer has not expired, then at step 522, the method comprises transmitting a request for a second HARQ transmission with same NDI. The request for the second HARQ transmission is for retransmission of the information transmitted in the first HARQ transmission.

At step 524, the method 500 comprises receiving a second HARQ transmission. The second HARQ transmission is a retransmission of information of the first HARQ transmission.

At step 520, if it is determined that the C-DRX inactivity timer has expired, then the method 500 loops back to the step 501 to determine the availability of new information for UL transmission from the UE.

It should be noted that a person skilled in the art may understand that the base station performs the second HARQ transmission, which is a retransmission of same information, thereby increasing the risk that the UE transmits a MAC SDU which has already been successfully received by the gNB and has been delivered to higher layers. Specifically, there is a possibility that transmission #1 (302) was successful and decoded correctly by the gNB, so that the toggled NDI for transmission #2 (306) actually indicates a request for new data. In such a scenario, transmission #2 will include a second copy of the same MAC PDU. In such a case, for example the RLC PDU contained inside the MAC PDU shall, according to the RLC protocol, be identified as duplicate and discarded.

It should be further noted that if incremental redundancy is being used, at steps 516 and 714 (in FIG. 7), the incremental redundancy shall be reinitialized similar to that of new HARQ data transmissions.

Figure 6:
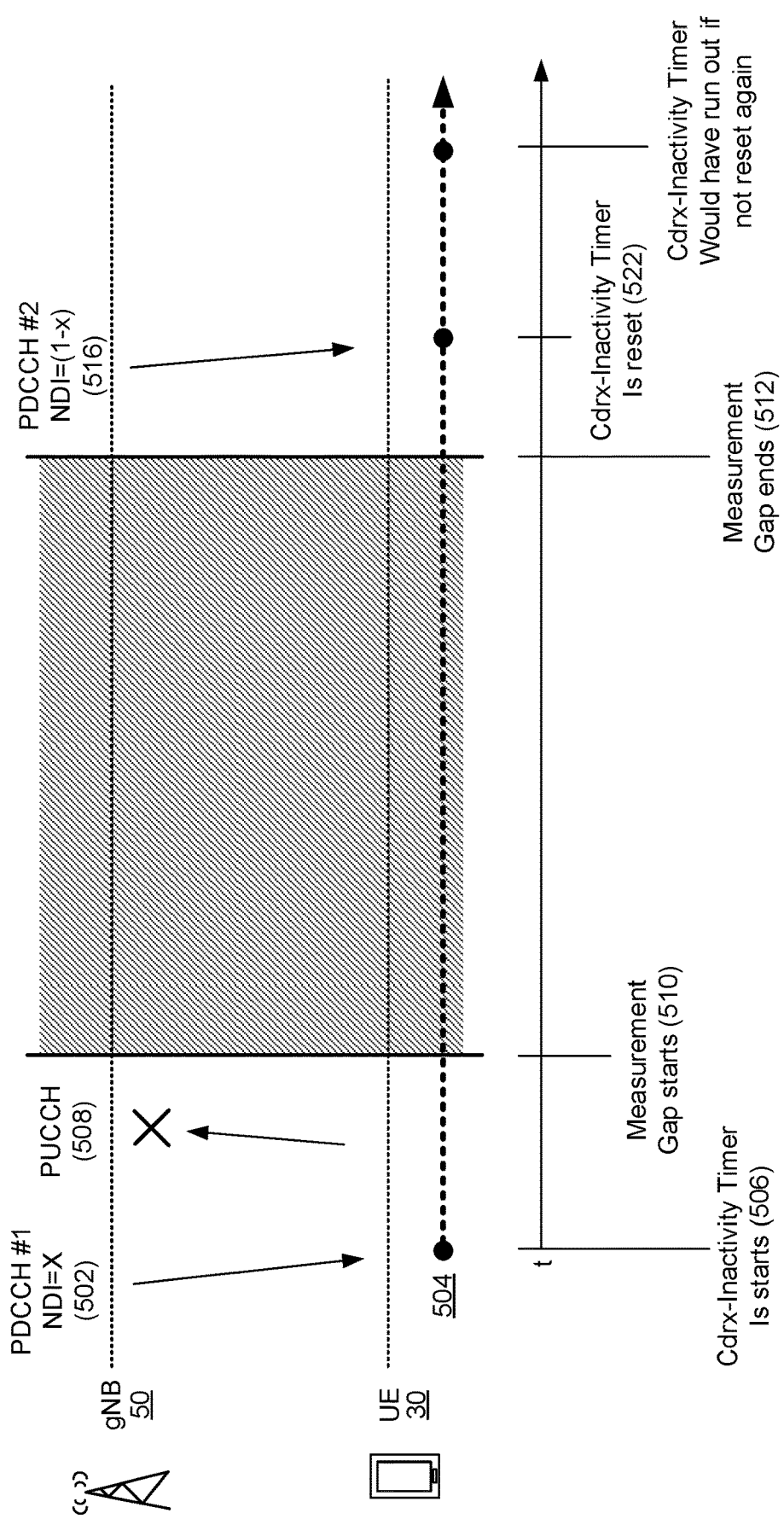
FIG. 6 is an example schematic diagram showing various steps between base station and user equipment for UL HARQ transmission according to some embodiments.

FIG. 6 is an example schematic diagram showing various steps between a base station 50 and a UE 30 for UL HARQ transmission according to the flow chart described in FIG. 5. When the UE 30 is operating in C-DRX mode and is configured with a measurement gap which overlaps with the time interval of the C-DRX inactivity timer, the base station 50 and the UE 30 performs various steps for UL HARQ retransmission as described herein.

Initially, at time t=0, the base station i.e., gNB 50 initiates a transmission of a request (indicated as #1) for the first HARQ transmission and the PDCCH is signalled 502 to the UE 30. The request for the first transmission is related to a single HARQ process and the request is transmitted along with an NDI. For example, the value of the NDI is set to "0". When the UE receives 504 the PDCCH, the C-DRX Inactivity timer starts 506 and the C-DRX Inactivity timer expires at t=8 ms unless the C-DRX inactivity timer is reset. In response to the request from the base station 50, the UE transmits the first UL HARQ transmission to the gNB 50. The gNB 50 receives the first UL HARQ transmission from the UE 30. When the gNB 50 decodes 508 the corresponding PUCCH 201, the feedback for transmission #1 is NACK.

At time interval i.e., t=1, the measurement gap has started 510. The gNB 50 cannot send 310 any information to the UE 30 until t=7. After the end 512 of the measurement gap, i.e., at t=7, the gNB 50 transmits a request for a second HARQ transmission, indicated as transmission #2 to the UE 30. Since, the transmission #1 was marked as NACK, the gNB 50 transmits 516 a request for second HARQ transmission, indicated as transmission #2 to the UE 30. Thus, the gNB 50 transmits the request for second HARQ transmission, which is a request for retransmission of the same information transmitted by the UE 30 in the transmission #1. The request for the second HARQ transmission is transmitted with the toggled NDI to indicate the UE 30 that the request for the second HARQ transmission is for new information, although the request for the second HARQ transmission is for retransmission of same information transmitted by the UE in the transmission #1. In response to second HARQ transmission from the UE 30, the C-DRX Inactivity timer is reset 522.

Figure 7:
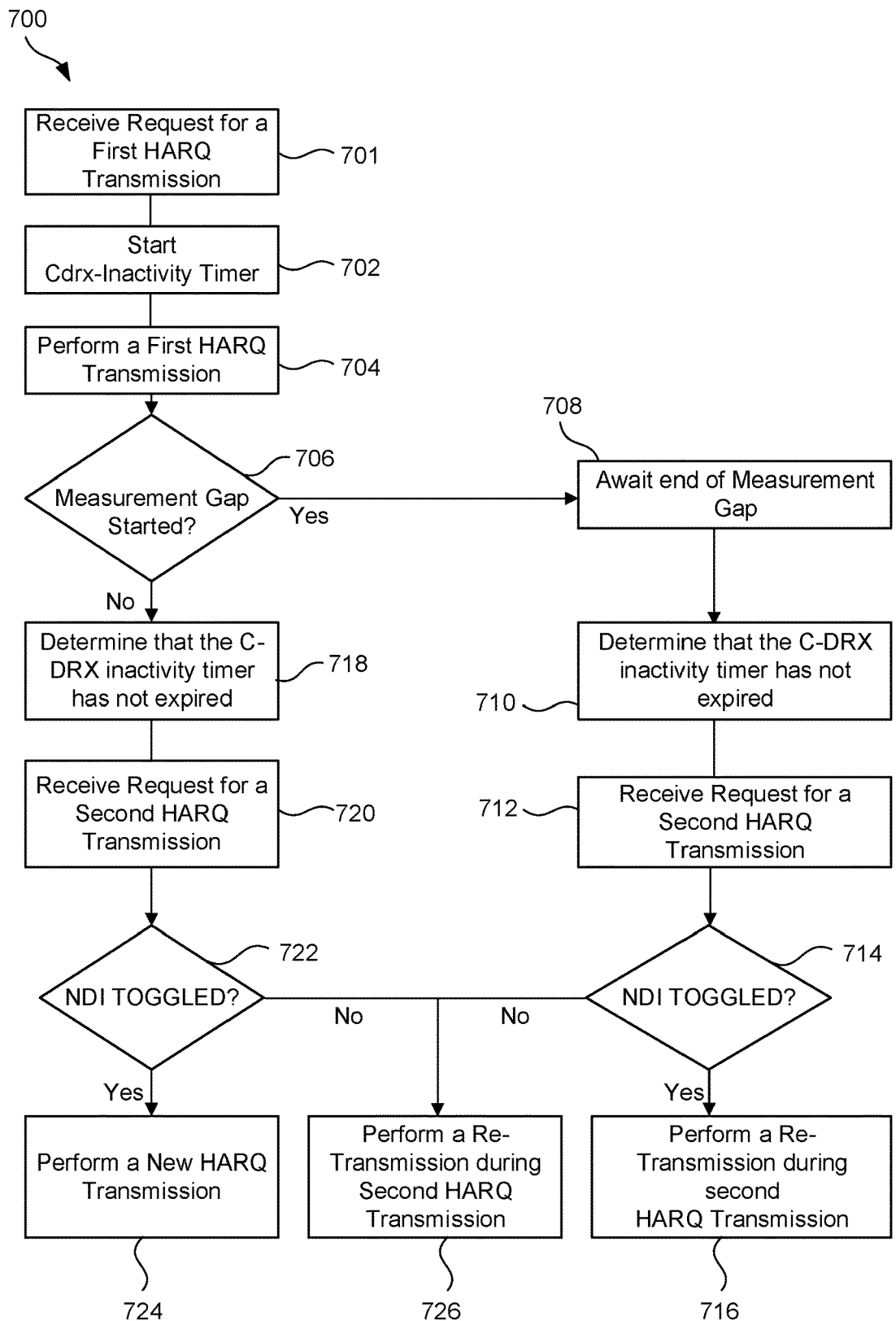
FIG. 7 is a flowchart illustrating example method steps for handling uplink, UL HARQ transmission by the UE according to some embodiments.

FIG. 7 is a flowchart illustrating example method steps for handling uplink, UL HARQ transmission according to some embodiments. The UE performs various steps in method 700 for handling UL HARQ retransmission as described herein. At step 701, the UE receives a request for first HARQ transmission from a base station. In response to the request for first HARQ transmission from the base station, at step 702, the method 700 comprises starting a C-DRX inactivity timer. When the C-DRX inactivity timer is running, at step 704, the UE performs the first UL HARQ transmission to the base station. After the first UL HARQ transmission, at step 706, the method 700 comprises detecting whether the measurement gap has started.

When it is determined that the measurement gap has started, then at step 708, the method 700 comprises awaiting end of the measurement gap. After the end of the measurement gap, at step 710, determining that the C-DRX inactivity timer has not expired at a time where the measurement gap has ended. When it is determined that the C-DRX inactivity timer has not expired, at step 712, the method comprises receiving a request for second HARQ transmission from the base station. At step 714, the method 700 comprises determining whether the NDI is toggled in the received request from the base station. If it is determined that the NDI is toggled, then at step 716, the method comprises performing a second HARQ transmission to the base station 50. The UE, during the second HARQ transmission, transmits the same information which it has transmitted to the base station in the first HARQ transmission at step 704. Thus, the UE, at step 716, performs the second HARQ transmission which is a retransmission of the same information that the UE has transmitted to the base station in step 704 even though the NDI is toggled, to allow the UE to perform a new transmission. Therefore, it should be noted that the UE performs retransmission of the same information during the second HARQ transmission to the base station, at step 716. In response to the second HARQ transmission to the base station, the C-DRX inactivity timer is restarted.

If at step 714, it is determined that the NDI is not toggled, then at step 726, the method 700 comprises performing a retransmission of the same information during the second HARQ transmission. The UE transmits the same information which it has transmitted to the base station in the first HARQ transmission at step 704. Therefore, it should be noted that the UE performs the retransmission of the same information when the NDI is not toggled (i.e., NDI is same in relation to the value of the NDI of the first HARQ transmission).

Further, at step 706, if it is determined that the measurement gap has not started, then at step 718, the method 700 comprises determining that the C-DRX inactivity timer has not expired. When it is determined that the C-DRX inactivity timer has not expired, at step 720, the method 700 comprises receiving a request for second HARQ transmission. After receiving the request for second HARQ transmission, at step 722, the method comprises determining whether the whether the NDI is toggled in the received request from the base station 50. If it is determined that the NDI is toggled, then at step 724, the method comprises performing a new HARQ transmission to the base station. The UE transmits new information to the base station during the new HARQ transmission at step 724, when the NDI is toggled. Thus, when the NDI is toggled, the toggled NDI indicates the UE for a new information transmission and then the UE transmits new information to the base station. In response to the new HARQ transmission to the base station, the C-DRX inactivity timer is restarted.

In case, at step 722, if it is determined that the NDI is not toggled, then at step 726, the method 700 comprises performing a retransmission of the same information during the second HARQ transmission. As described above, the UE transmits the same information which it has transmitted to the base station in the first HARQ transmission at step 704. Therefore, it should be noted that the UE performs the retransmission of the same information when the NDI is not toggled (i.e., NDI is same in relation to the value of the NDI of the first HARQ transmission) during the second HARQ transmission.

Figure 8:
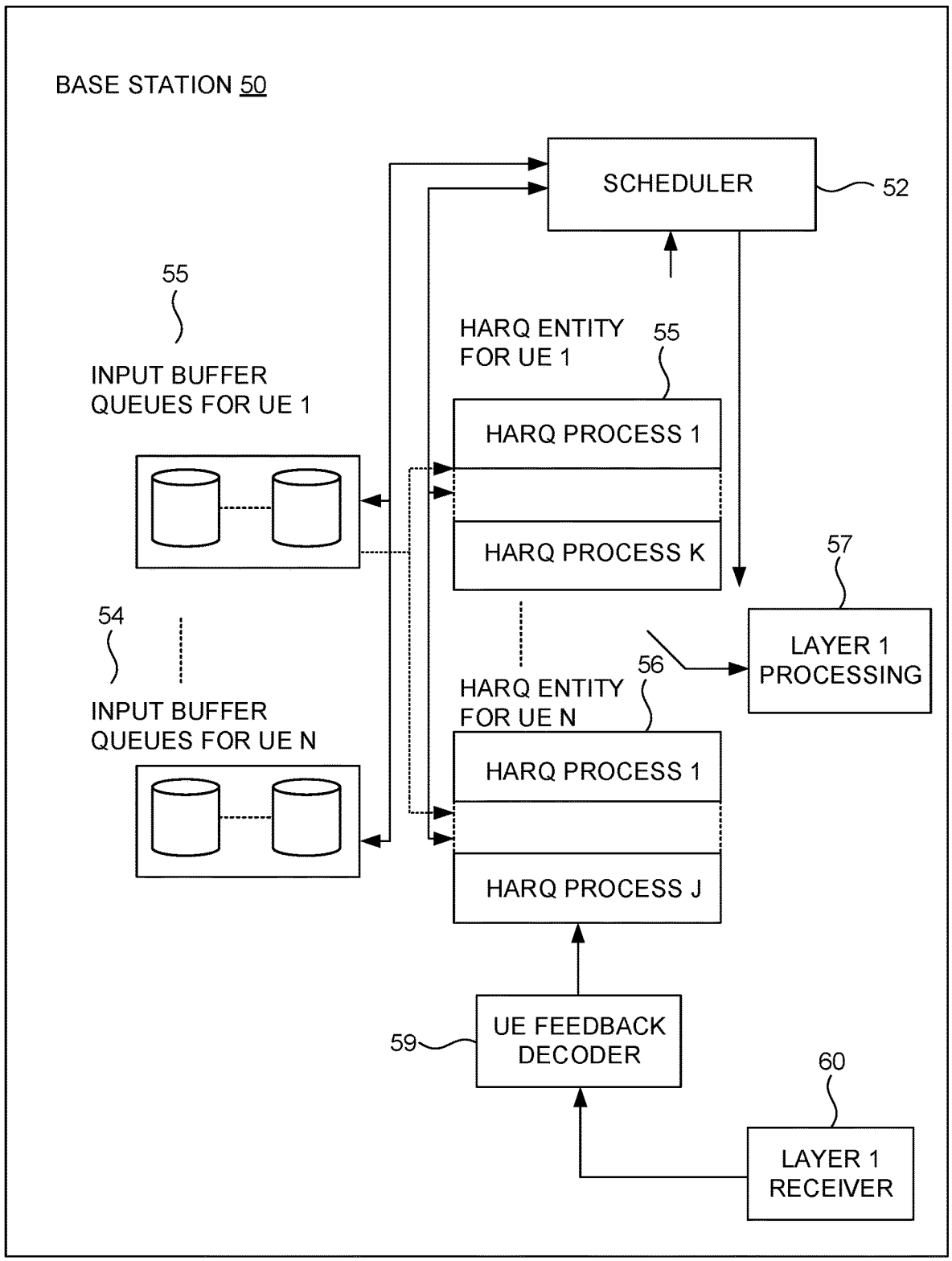
FIG. 8 is a block diagram of a base station showing functional modules for handling DL and UL HARQ transmissions according to some embodiments.

FIG. 8 is a block diagram of a base station showing functional modules for handling DL and UL HARQ transmissions according to the flow charts described in FIGS. 3 and 5. As depicted in FIG. 8, the base station 50 comprises a scheduler, 52, a plurality of input buffers, 53, 54, storing segments of data streams pertaining to individual UEs, i.e., for example, UEs 30a-30n. For each UE, a HARQ entity 55, 56 each comprising a number of HARQ processes for handling simultaneous transmissions to several UEs, that is, for each UE. The base station 50 also comprises Layer 1 processing means 57 for transferring data from respective HARQ processes. The base station 50 moreover comprises a UE feedback decoder 59 and a Layer 1 receiver 60.

Each HARQ process 55, 56, in a given UE is mirrored in the base station 50 and corresponds to a given data stream which is received by a particular UE. As explained above, more data streams may be used by the UE simultaneously corresponding to one application or more simultaneous applications running on the UE, possibly with different QoS requirements. Moreover, consecutive data may be transmitted for the same UE, the consecutive transmission belonging to different HARQ processes.

Furthermore, the base station 50 comprises one or more input buffer queues dedicated to a corresponding set of HARQ processes.

Figure 9:
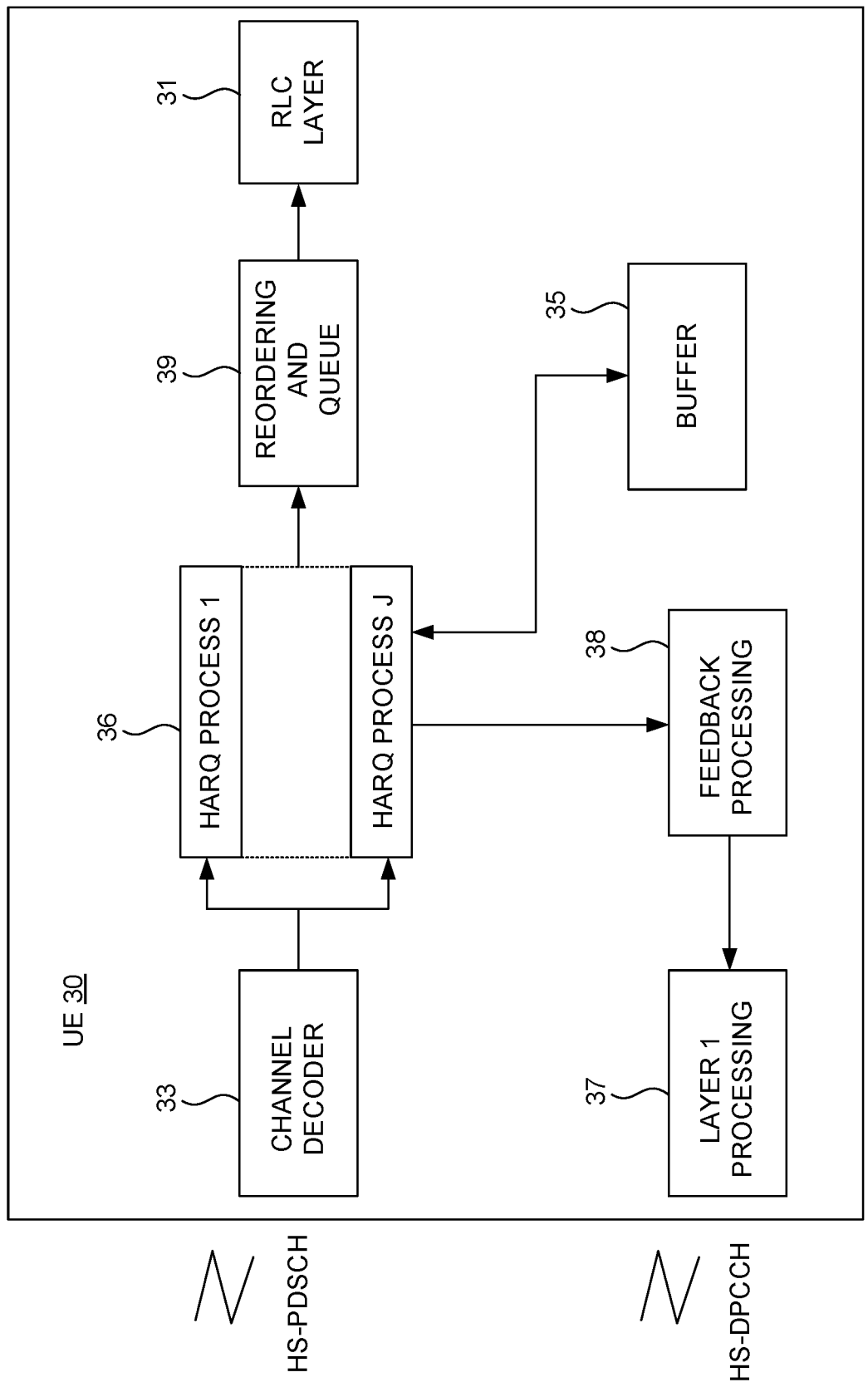
FIG. 9 is a block diagram of a user equipment showing functional modules for handling DL and UL HARQ transmissions according to some embodiments.

FIG. 9 is a block diagram of a UE 30 showing functional modules for handling UL HARQ transmissions according to the flow chart described in FIG. 7. As depicted in FIG. 9, the UE 30 includes a HS-SCCH decoding means, i.e., a channel decoder 33, for decoding the downlink HD-PDSCH channel, arrangements comprising a number of HARQ processes 36 namely HARQ process 1 to HARQ process J, a reordering and queue 39, and a Radio Link Control layer, RLC means, 31. Further, the UE 30 is provided with a feedback processing means, 38, and layer 1 processing, 37, for providing feedback on the HS-DPCCH channel. Furthermore, buffer means 35 are provided for each HARQ process 36. The buffer means 35 may be arranged as one resource or buffer means 35 may be a plurality of resources or buffers. The buffer means 35 may be arranged as a soft memory which is partitioned across the HARQ processes in a semi-static fashion through upper layer signalling.

The reordering and queue, 39, routes the MAC-hs PDU's to the correct reordering buffer based on a Queue ID. The reordering and queue reorders received MAC-hs PDU's according to the received transmit sequence number, TSN. To recover from erroneous conditions when MAC-hs PDU are missing, the same avoidance handling as described in 3GPP TS 25.321-11.6.2, re-ordering release timer and window-based stall avoidance, is used. There exists one reordering entity for each Queue ID configured at the UE 30.

The RLC layer 31 in 3GPP can operate in three modes, transparent mode, unacknowledged mode and acknowledged mode, AM, which are described herein. In AM mode, incorrectly received Protocol Data Units, PDU's discovered by the receiving side are effected to be retransmitted by the transmitting side by means of an Automatic Repeat Request, ARQ, protocol. An AM RLC entity consists of a transmitting side, and a receiving side, where the transmitting side of the AM RLC entity transmits RLC PDU's and the receiving side of the AM RLC entity receives RLC PDU's. An AM RLC entity resides in the UE and in the radio network control, RNC respectively. The transmitting side segments and/or concatenates RLC service data units, SDU's into PDU's of a fixed length. The receiving side reassembles received PDU's into RLC SDU's and transmits these to higher data layers. Likewise, SDU's are received from the layer above the RLC layer. In AM mode, the RLC layer is responsible for the delivery of SDU's in consecutive order.

Figure 10:
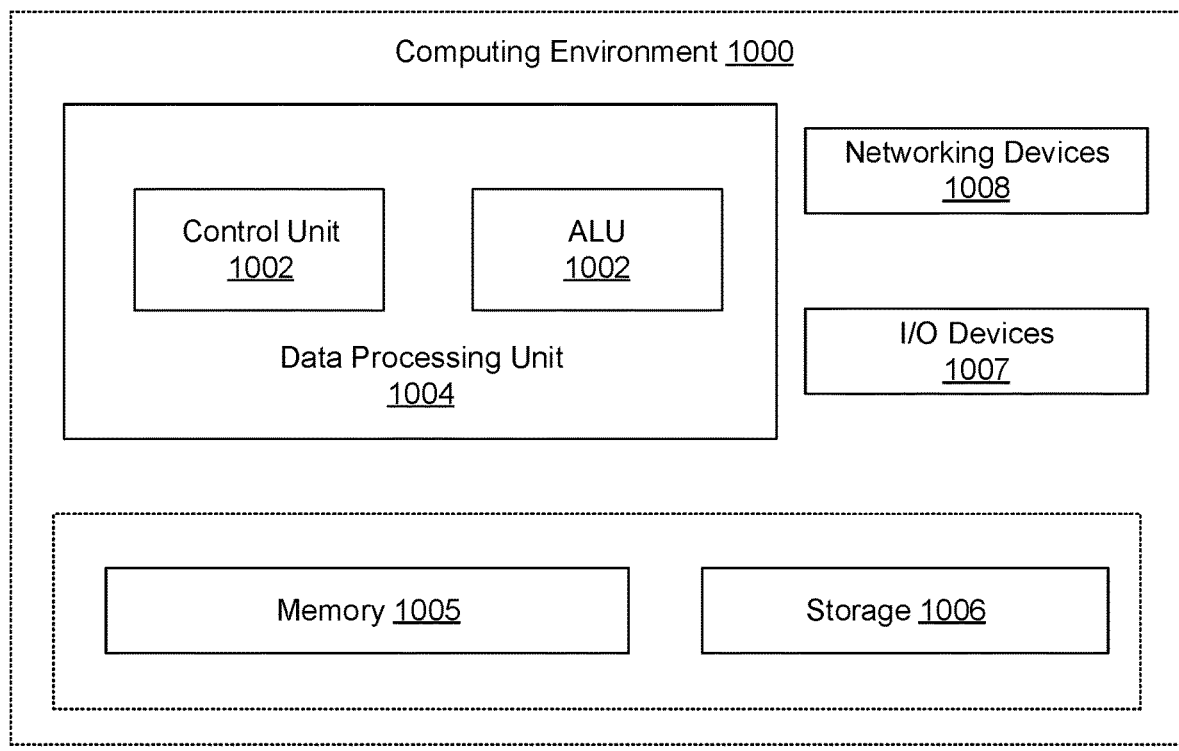
FIG. 10 discloses an example computing environment, according to some embodiments.

FIG. 10 illustrates an example computing environment 1000 implementing a method, a base station and a user equipment for handling DL and UL HARQ transmissions as described in FIGS. 3, 5 and 7. As depicted in FIG. 10, the computing environment 1000 comprises at least one data processing unit 1004 that is equipped with a control unit 1002 and an Arithmetic Logic Unit, ALU 1003, a memory 1005, a storage 1006, plurality of networking devices 1008 and a plurality Input output, I/O devices 1007. The data processing unit 1004 is responsible for processing the instructions of the algorithm. The data processing unit 1004 is capable of executing software instructions stored in memory 1005. The data processing unit 1004 receives commands from the control unit 1002 in order to perform its processing. Further, any logical and arithmetic operations involved in the execution of the instructions are computed with the help of the ALU 1003.

The overall computing environment 1000 can be composed of multiple homogeneous and/or heterogeneous cores, multiple CPUs of different kinds, special media and other accelerators. The data processing unit 1004 is responsible for processing the instructions of the algorithm. Further, the plurality of data processing units 1004 may be located on a single chip or over multiple chips.

The algorithm comprising of instructions and codes required for the implementation are stored in either the memory 1005 or the storage 1006 or both. At the time of execution, the instructions may be fetched from the corresponding memory 1005 and/or storage 1006 and executed by the data processing unit 1004.

In case of any hardware implementations various networking devices 1008 or external I/O devices 1007 may be connected to the computing environment to support the implementation through the networking devices 1008 and the I/O devices 1007.

The embodiments disclosed herein can be implemented through at least one software program running on at least one hardware device and performing network management functions to control the elements. The elements shown in FIG. 10 include blocks which can be at least one of a hardware device, or a combination of hardware device and software module.

Figure 11:
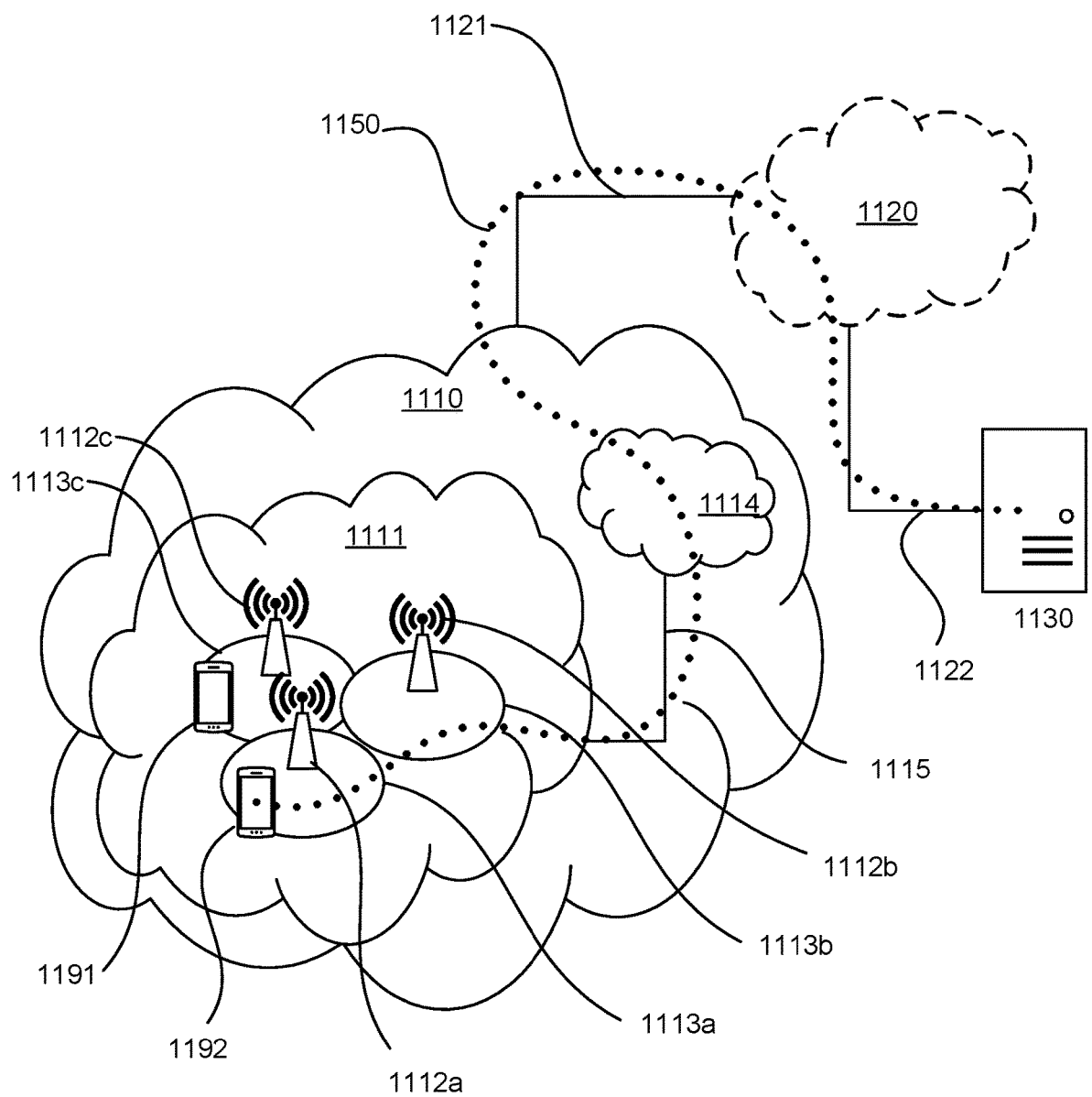
FIG. 11 illustrates a telecommunication network connected via an intermediate network to a host computer according to some embodiments.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider or may be operated by the service provider or on behalf of the service provider. Connections 1121 and 1122 between telecommunication network 1110 and host computer 1130 may extend directly from core network 814 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signalling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 912 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 950.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. It's hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. The UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 910. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 9 may be similar or identical to host computer 1130, one of base stations 112a, 1112b, 1112c and one of UEs 1191, 1192 of FIG. 11, respectively. This is to say, the inner workings of these entities may be as shown in FIG. 12 and independently, the surrounding network topology may be that of FIG. 11.

Figure 12:
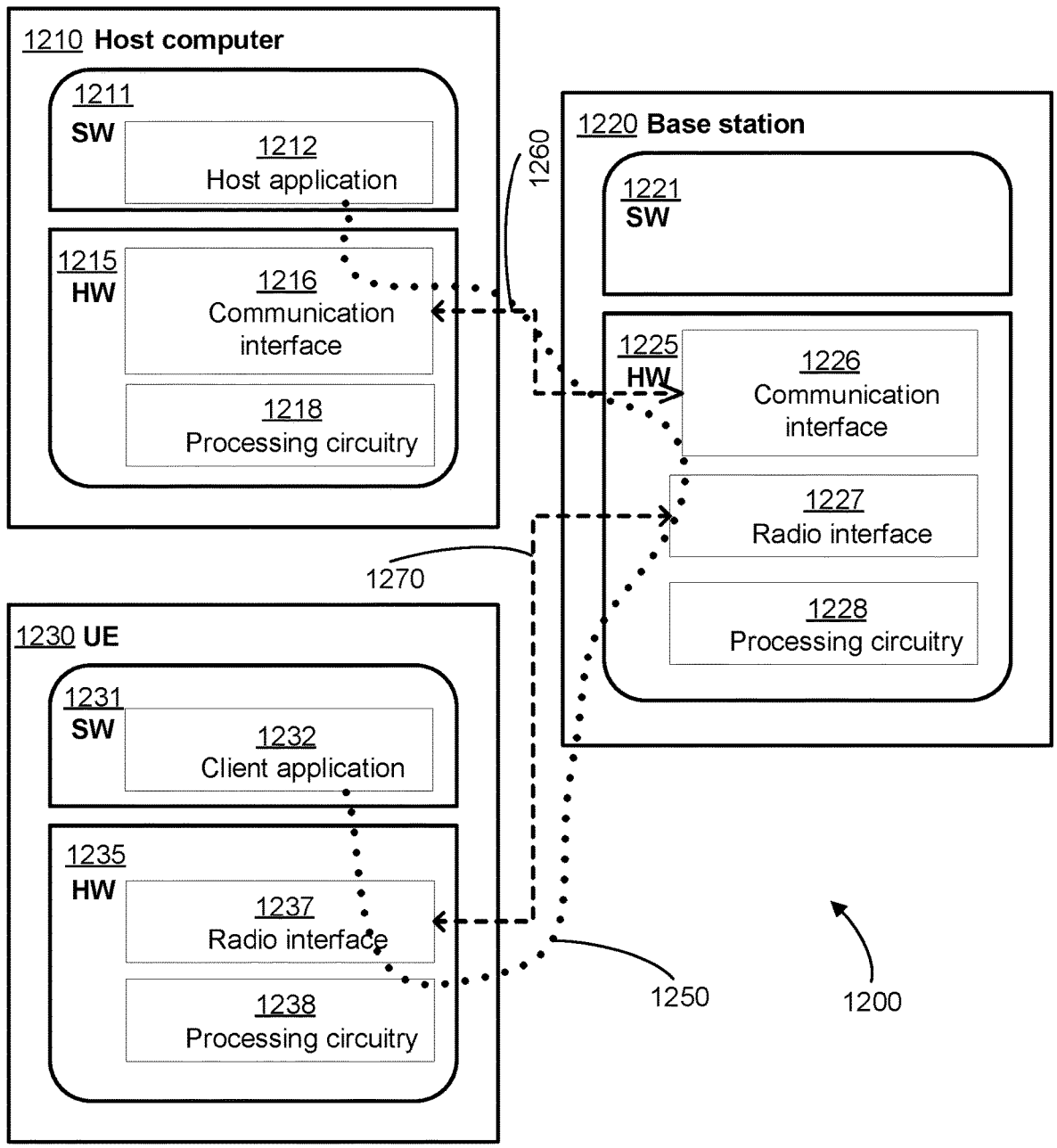
FIG. 12 illustrates a host computer communicating via a base station with a user equipment over a partially wireless connection according to some embodiments.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250.

Various embodiments described in the present disclosure can be used for reducing latency during delivery of Over-the-Top, OTT, services from the network to the UEs.

Thus, in the above implementation of delivering OTT services to the UEs, the OTT content can be delivered to the UEs by reducing the latency of the content being delivered from the base station to the UE.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

Abbreviations

| Abbreviation | Explanation |
| --- | --- |
| LTE | Long-Term Evolution, a wireless communications standard |
| 5G NR | 5$^{th}$ Generation New Radio, a wireless communications standard |
| RBS | Radio Base Station |
| eNB | evolved NodeB, the RBS in LTE |
| gNB | next generation NodeB, the RBS in 5G NR |
| UE | User Equipment, any device communicating wirelessly with the eNB and/or UE |
| TX or Tx | Transmission, transmitter or transmit |
| RX or Rx | Reception, receiver or receive |
| Re-Tx | Retransmission, i.e. transmitting data that has already been transmitted |
| DTX | Discontinuous Transmission, meaning a device does not transmit anything, here used to represent an expected message which appears to be missing completely |
| DRX | Discontinuous Reception, meaning a device does not receive any transmissions |
| C-DRX | Connected Mode DRX, a configuration where the UE can go into a DRX state at certain times |
| Meas gap | Measurement gap, meaning a period during which UE suspends communication in order to perform measurements |
| ACK | Acknowledged, indicating a message was received and decoded successfully |
| NACK | Not Acknowledged, indicating a message was not received or not decoded |
| PDCCH | Physical Downlink Control Channel |
| PUCCH | Physical Uplink Control Channel |
| PDSCH | Physical Downlink Shared Channel |
| PUSCH | Physical Uplink Shared Channel |
| DL | Downlink, anything sent from the RBS to the UE |
| UL | Uplink, anything sent from the UE to the RBS |
| DCI | Downlink Control Information, an information block transmitted over PDCCH |
| NDI | New Data Indicator, a field contained in the DCI |
| HARQ | Hybrid Automated Repeat Request, a protocol for retransmission of data; part of the MAC protocol in 5G NR |
| ID | identifier |
| MAC | Medium Access Control, a protocol used in 5G NR |
| RLC | Radio Link Control, a protocol used n 5G NR |
| PDU | Protocol Data Unit, denoting a packet of data sent over e.g. the MAC or RLC protocol |

The invention claimed is:

1. A method performed by a base station for handling downlink, DL, hybrid automatic repeat request, HARQ, transmissions for a user equipment, UE, operating in a connected discontinuous reception, C-DRX, mode, wherein the method comprises:
performing a first HARQ transmission comprising information related to a single HARQ process to the UE with an associated new data indicator, NDI, wherein a toggling of the NDI indicating at least a change of information of the single HARQ process over a previous HARQ transmission, said first HARQ transmission moreover starting a C-DRX inactivity timer;
determining that a HARQ negative acknowledgment, NACK has been received, for the transmitted information from the UE;
detecting whether a measurement gap has started and if the measurement gap has started, awaiting an end of the measurement gap;
determining whether the C-DRX timer has expired at a time where the measurement gap has ended; and
if the C-DRX inactivity timer has not expired, performing a second HARQ transmission, which is a retransmission of said information, with associated NDI to the UE for the single HARQ process, wherein a value of the NDI is toggled in relation to a value of the NDI of the first HARQ transmission.

2. The method according to claim 1, wherein if the measurement gap has not started and if the C-DRX Inactivity timer has not expired, the method comprises performing a second HARQ transmission, which is a retransmission of said information, with associated NDI to the UE for the single HARQ process, wherein the NDI value is the same in relation to the NDI value of the first HARQ transmission.

3. The method according to claim 1, wherein the C-DRX inactivity timer is restarted by reception of the second HARQ transmission.

4. The method according to claim 1, wherein the measurement gap overlaps at least partly with a time interval between a start and expiry of the C-DRX inactivity timer.

5. The method according to claim 1, wherein the C-DRX inactivity timer being configured to expire in a pre-determined time interval after ending of the measurement gap.

6. A method performed by a base station for handling uplink, UL, hybrid automatic repeat request, HARQ, transmissions from a user equipment, UE operating in a connected discontinuous reception, C-DRX, mode, wherein the method comprises:
transmitting a request for a first HARQ transmission related to a single HARQ process with an associated new data indicator, NDI to the UE, wherein a toggling of the NDI indicating at least a change of information of the single HARQ process over a previous transmission, said first HARQ transmission from the UE moreover starting a C-DRX inactivity timer;
receiving the first HARQ transmission from the UE and determining that a HARQ negative acknowledgment, NACK, has been received;
detecting whether a measurement gap has started and if the measurement gap has started, awaiting an end of the measurement gap;
determining whether the C-DRX Inactivity timer has expired at a time where the measurement gap has ended; and
if the C-DRX inactivity timer has not expired, transmitting a request for a second HARQ transmission of said information, with associated NDI to the UE for the single HARQ process, wherein a value of the NDI is toggled in relation to a value of the NDI of the first HARQ transmission.

7. The method according to claim 6, wherein if the measurement gap has not started and if the C-DRX inactivity timer has not expired, the method comprising:
transmitting a request for a second HARQ transmission, with associated NDI to the UE for the single HARQ process, wherein a value of the NDI is same in relation to a value of the NDI of the first HARQ transmission.

8. The method according to claim 6, wherein the method further comprising:
receiving the second HARQ transmission from the UE.

9. The method according to claim 6, wherein the C-DRX inactivity timer is restarted by reception of the second HARQ transmission.

10. The method according to claim 6, wherein the measurement gap overlaps at least partly with a time interval between a start and expiry of the C-DRX inactivity timer.

11. The method according to claim 6, wherein the C-DRX inactivity timer being configured to expire in a pre-determined time interval after ending of the measurement gap.

12. A method performed by a user equipment, UE, for handling uplink, UL, hybrid automatic repeat request, HARQ, transmissions to a base station, the UE operating in a connected discontinuous reception C-DRX mode, wherein the method comprises:
receiving a request for a first HARQ transmission related to a single HARQ process with an associated new data indicator, NDI, from the base station, wherein a toggling of the NDI indicating at least a change of information of the single HARQ process over a previous transmission, said request for first HARQ transmission moreover starting a C-DRX inactivity timer;
performing the first HARQ transmission to the base station, and detecting whether a measurement gap has started and if the measurement gap has started, awaiting an end of the measurement gap;
determining that the C-DRX inactivity timer has not expired at a time where the measurement gap has ended;
if the C-DRX inactivity timer has not expired, receiving a request for a second HARQ transmission of said information, with associated NDI from the base station for the single HARQ process;
determining whether a value of the NDI is toggled in relation to a value of the NDI of the first HARQ transmission; and
if the value of the NDI is toggled, performing a retransmission, of said information during second HARQ transmission to the base station.

13. The method according to claim 12, wherein if the value of the NDI is not toggled, performing a retransmission during the second HARQ transmission.

14. The method according to claim 12, wherein if the measurement gap has not started and the C-DRX inactivity timer has not expired, the method comprises:
receiving a request for a second HARQ transmission with an associated NDI from the base station for the single HARQ process;
determining whether a value of the NDI is toggled in relation to a value of the NDI of the first HARQ transmission;
if the value of the NDI is toggled, performing a new HARQ transmission to the UE; and
if the value of the NDI is not toggled, performing a retransmission during second HARQ transmission to the UE.

15. The method according to claim 12, wherein the C-DRX inactivity timer is restarted by the second HARQ retransmission.

16. The method according to claim 12, wherein the measurement gap overlaps at least partly with a time interval between a start and expiry of the C-DRX inactivity timer.

17. A base station for handling downlink, DL, hybrid automatic repeat request, HARQ, transmissions for a user equipment, UE, operating in a connected discontinuous reception C-DRX mode, the base station having a plurality of HARQ entities cooperating with a scheduler for transmitting frames from the base station to the UE, the base station being adapted for:
performing a first HARQ transmission comprising information related to a single HARQ process to the UE with an associated new data indicator, NDI, wherein a toggling of the NDI indicating at least a change of information of the single HARQ process over a previous HARQ transmission, said first HARQ transmission moreover starting a C-DRX inactivity timer;
determining that a HARQ negative acknowledgment, NACK has been received, for the transmitted information from the UE;
detecting whether a measurement gap has started and if the measurement gap has started, awaiting an end of the measurement gap;
determining whether the C-DRX inactivity timer has expired at a time where the measurement gap has ended; and
if the C-DRX inactivity timer has not expired, performing a second HARQ transmission which is a retransmission of said information, with associated NDI to the UE for the single HARQ process, wherein a value of the NDI is toggled in relation to a value of the NDI of the first HARQ transmission.

18. A base station for handling uplink, UL hybrid automatic repeat request, HARQ, transmissions from a user equipment, UE operating in a connected discontinuous reception, C-DRX, mode, the base station having a plurality of HARQ entities cooperating with a scheduler for transmitting frames from the base station to the UE, the base station being adapted for:
transmitting a request for a first HARQ transmission related to a single HARQ process with an associated new data indicator, NDI to the UE, wherein a toggling of the NDI indicating at least a change of information of the single HARQ process over a previous transmission, said request for first HARQ transmission from the UE moreover starting a C-DRX inactivity timer;
receiving the first HARQ transmission from the UE and, determining that a HARQ negative acknowledgment, NACK has been received;
detecting whether a measurement gap has started and if the measurement gap has started, awaiting an end of the measurement gap; and
determining whether the C-DRX inactivity timer has expired at a time where the measurement gap has ended;
if the C-DRX inactivity timer has not expired, transmitting a request for a second HARQ transmission of said information, with associated NDI to the UE for the single HARQ process, wherein a value of the NDI is toggled in relation to a value of the NDI of the first HARQ transmission.

19. A UE for handling uplink, UL, hybrid automatic repeat request, HARQ, transmissions to a base station, the UE operating in a connected discontinuous reception, C-DRX, mode, the UE engaging in at least one HARQ process for transmitting data to a base station, wherein the UE being adapted for:
receiving a request for a first HARQ transmission related to a single HARQ process with an associated new data indicator, NDI from the base station, wherein a toggling of the NDI indicating at least a change of information of the single HARQ process over a previous transmission, said request for first HARQ transmission moreover starting a C-DRX inactivity timer;

performing the first HARQ transmission to the base station, detecting whether a measurement gap has started and if the measurement gap has started, awaiting an end of the measurement gap;

determining that the C-DRX inactivity timer has not expired at a time where the measurement gap has ended;

if the C-DRX inactivity timer has not expired, receiving a request for a second HARQ transmission of said information, with associated NDI from the base station for the single HARQ process, determining whether a value of the NDI is toggled in relation to a value of the NDI of the first HARQ transmission; and if the value of the NDI is toggled, performing a retransmission, of said information during second HARQ transmission to the base station.

\* \* \* \* \*